E. BUGATTI.
SPRING FOR VEHICLE SUSPENSION.
APPLICATION FILED AUG. 26, 1913.
1,107,027.
Patented Aug. 11, 1914.
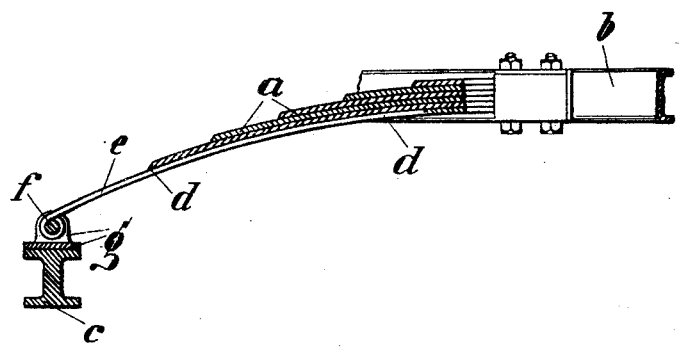
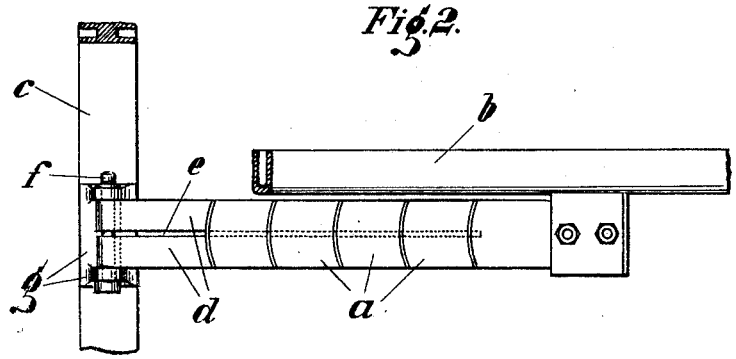
Witnesses
Inventor
Ettore Bugatti
by his attorney

# UNITED STATES PATENT OFFICE.

ETTORE BUGATTI, OF MOLSHEIM, GERMANY.

SPRING FOR VEHICLE SUSPENSION.

1,107,027. Specification of Letters Patent. Patented Aug. 11, 1914.

Application filed August 26, 1913. Serial No. 786,809.

*To all whom it may concern:*

Be it known that I, ETTORE BUGATTI, a subject of the King of Italy, and residing at Molsheim, Alsace, Germany, have invented certain new and useful Improvements in Springs for Vehicle Suspension, of which the following is a specification.

The present invention has reference to improvements in springs, and relates more specifically to improvements in laminated springs such as are used for suspending the bodies of vehicles, and especially those of automobiles. Such springs, built up of a series of superposed laminæ, are used either singly or in pairs, closely adjacent to one another. When being used singly, these springs necessarily must be made relatively wide across, with the result that the main or carrier leaf is apt to break by reason of the unavoidable twisting stress it is being subjected to owing to the unevenness of the roadbed traveled over. The use of such springs in pairs, when each spring can be relatively narrow, in a measure prevents such fractures, but it carries with it the disadvantage that the two units must be built up separately, in which case the lengths of the carrier leaves, measured from the points of attachment at the vehicle body to the spring eye bolts, never are identical, so that recourse must be had to shackles or the like, as intermediate members.

The object of the invention is to obtain the advantages of the double spring with a single spring, and I obtain this by slitting the carrier leaf of the laminated spring partway down the center.

In order to make this invention more readily understood, I will now describe it in detail with reference to the accompanying drawing, in which—

Figure 1 represents a longitudinal section through a spring of my invention, with adjacent parts partly in section; Fig. 2 shows a plan view thereof.

The drawing, by way of example, shows a one-arm spring construction, but it is obvious that the invention is also applicable to other forms of springs of this character.

The laminated spring *a* is suitably secured at one end to the vehicle frame *b* and at the other end to the car axle *c*. The carrier plate *d* of the spring is provided with a longitudinal slit *e*, running down the center the greater part of the entire length of the spring. This main plate is supported at the eye ends by the common bolt *f*, which in turn is secured in the lugs *g* rising from the axle *c*.

The main leaf *d* should preferably be finished prior to being slitted, so that the eye bores, for the bolt *f*, extend co-axially true. By reason of the carrier leaf being thus divided into two relatively narrow leaves over a considerable distance, twisting of the springs will show no such disastrous effects as in the case of wide single springs.

What I claim and desire to secure by Letters Patent is:—

1. A leaf spring for vehicle suspension, comprising in combination, a carrier leaf slitted along the longitudinal center line for the greater part of its length, and a series of superimposed, overlapping non-slitted spring laminæ.

2. A leaf spring for vehicle suspension, comprising a carrier member having a longitudinal slit down the center line extending the greater part of its length, whereby two parallel independently operable spring halves are obtained with a common base end, securing means at the free ends of said spring halves, and a series of superposed, overlapping non-slitted spring laminæ, all starting at the base end of said carrier member and of the same width thereof.

3. A leaf spring for vehicle suspension, comprising a carrier member having a longitudinal slit down the center line extending the greater part of its length, leaving a common base end of the combined width of the thus obtained spring halves, co-axial integral bolt eyes at the free ends of said spring halves, and a series of superposed non-slitted spring laminæ of increasing length, the longest one thereof, which contacts with the said carrier member, terminating inwardly from the free extremities of said spring halves at a distance sufficient to allow of the spring halves operating more or less independently of one another.

In testimony whereof I affix my signature in presence of two witnesses.

ETTORE BUGATTI.

Witnesses:
JOSEPH ROBINSON,
MILO A. JEWETT.

Copies of this patent may be obtained for five cents each, by addressing the "Commissioner of Patents, Washington, D. C."